US008493911B2

(12) United States Patent
Park et al.

(10) Patent No.: US 8,493,911 B2
(45) Date of Patent: Jul. 23, 2013

(54) METHOD OF RESTRICTING SCHEDULING REQUEST FOR EFFECTIVE DATA TRANSMISSION

(75) Inventors: Sung-Jun Park, Geyonggi-Do (KR);
Seung-June Yi, Gyeonggi-Do (KR);
Young-Dae Lee, Gyeonggi-Do (KR);
Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 12/677,392

(22) PCT Filed: Sep. 19, 2008

(86) PCT No.: PCT/KR2008/005550
§ 371 (c)(1),
(2), (4) Date: Mar. 10, 2010

(87) PCT Pub. No.: WO2009/038381
PCT Pub. Date: Mar. 26, 2009

(65) Prior Publication Data
US 2010/0202380 A1    Aug. 12, 2010

Related U.S. Application Data

(60) Provisional application No. 60/974,072, filed on Sep. 20, 2007.

(51) Int. Cl.
*H04W 4/00*    (2009.01)
(52) U.S. Cl.
USPC ........................................................ 370/328
(58) Field of Classification Search
None
See application file for complete search history.

(56) References Cited

U.S. PATENT DOCUMENTS

| 4,205,200 | A | 5/1980 | Prabodh et al. |
| 5,588,009 | A | 12/1996 | Will |
| 6,233,430 | B1 | 5/2001 | Helferich |
| 6,353,628 | B1 | 3/2002 | Wallace et al. |
| 6,567,409 | B1 | 5/2003 | Tozaki et al. |
| 6,725,267 | B1 | 4/2004 | Hoang |
| 6,785,256 | B2 | 8/2004 | O'Neil |
| 6,795,419 | B2 | 9/2004 | Parantainen et al. |
| 7,039,425 | B1 | 5/2006 | Mazawa et al. |
| 7,245,707 | B1 | 7/2007 | Chan |
| 7,373,148 | B2 | 5/2008 | Kim et al. |
| 7,443,813 | B2 | 10/2008 | Hwang et al. |

(Continued)

FOREIGN PATENT DOCUMENTS

| AU | 2007314859 B2 | 5/2008 |
| CN | 1719932 | 1/2006 |

(Continued)

OTHER PUBLICATIONS

NTT DoCoMo, Inc.: "MAC PDU Structure for LTE" R2-070280, 3GPP TSG RAN WG2, 56bis, Jan. 15-19, 2007, XP50133369.

(Continued)

*Primary Examiner* — Anh-Vu Ly
(74) *Attorney, Agent, or Firm* — McKenna Long & Aldridge LLP

(57) ABSTRACT

Disclosed is the radio (wireless) communication system providing a radio communication service and the terminal, and more particularly, to a method for restricting a use of particular control channel in an Evolved Universal Mobile telecommunications System (E-UMTS) evolved from the Universal Mobile Telecommunications System (UMTS) or a Long Term Evolution (LTE) system.

8 Claims, 4 Drawing Sheets

U.S. PATENT DOCUMENTS

| | | | |
|---|---|---|---|
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju et al. |
| 2001/0034791 A1 | 10/2001 | Clubb et al. |
| 2001/0044322 A1 | 11/2001 | Raff |
| 2002/0028690 A1 | 3/2002 | McKenna et al. |
| 2002/0057663 A1 | 5/2002 | Byung Keun Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 | 1/2004 | Lim et al. |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0147269 A1 | 7/2004 | Kim |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0249188 A1 | 11/2005 | Hayashi |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0039309 A1 | 2/2006 | Lee et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0142019 A1 | 6/2006 | Kroth et al. |
| 2006/0165045 A1 | 7/2006 | Kim et al. |
| 2006/0187846 A1 | 8/2006 | Pelletier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0041349 A1 | 2/2007 | Kim et al. |
| 2007/0041382 A1 | 2/2007 | Vayanos et al. |
| 2007/0047452 A1 | 3/2007 | Lohr |
| 2007/0047582 A1 | 3/2007 | Esa Malkamaki |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165635 A1 | 7/2007 | Zhang et al. |
| 2007/0177569 A1 | 8/2007 | Lundy |
| 2007/0178875 A1 | 8/2007 | Rao et al. |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhen et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1* | 1/2008 | Jeong et al. .................. 455/517 |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirksanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 | 10/2008 | Wang et al. |
| 2008/0267126 A1 | 10/2008 | Vujcic |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1* | 11/2008 | Onggosanusi et al. ....... 375/346 |
| 2008/0287091 A1 | 11/2008 | Suzuki et al. |
| 2008/0310452 A1 | 12/2008 | Vedantham et al. |
| 2008/0316959 A1* | 12/2008 | Bachl et al. .................. 370/329 |
| 2009/0005051 A1 | 1/2009 | Voyer et al. |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |

| | | | |
|---|---|---|---|
| 2009/0207771 A1 | 8/2009 | Lindskog | |
| 2009/0239538 A1 | 9/2009 | Motegi et al. | |
| 2009/0264164 A1 | 10/2009 | Chun et al. | |
| 2009/0318170 A1 | 12/2009 | Lee et al. | |
| 2010/0027413 A1 | 2/2010 | Park et al. | |
| 2010/0046384 A1 | 2/2010 | Lee et al. | |
| 2010/0061330 A1 | 3/2010 | Hanov | |
| 2010/0067495 A1* | 3/2010 | Lee et al. | 370/335 |
| 2010/0075635 A1 | 3/2010 | Lim et al. | |
| 2010/0128669 A1 | 5/2010 | Chun et al. | |
| 2010/0137016 A1 | 6/2010 | Voyer | |
| 2010/0165901 A1 | 7/2010 | Kim | |
| 2010/0195568 A1 | 8/2010 | Iimori | |
| 2010/0227614 A1 | 9/2010 | Chun | |
| 2010/0238799 A1 | 9/2010 | Sebire | |
| 2010/0238903 A1 | 9/2010 | Kitazoe | |
| 2010/0254340 A1* | 10/2010 | Park et al. | 370/329 |
| 2010/0265896 A1* | 10/2010 | Park et al. | 370/329 |
| 2010/0272004 A1 | 10/2010 | Maeda et al. | |
| 2010/0309877 A1 | 12/2010 | Damnjanovic et al. | |
| 2011/0039536 A1 | 2/2011 | Lee et al. | |
| 2011/0090836 A1 | 4/2011 | Mochizuki et al. | |
| 2011/0116436 A1 | 5/2011 | Bachu et al. | |
| 2011/0182243 A1 | 7/2011 | Gallagher et al. | |
| 2011/0207427 A1 | 8/2011 | Kitani et al. | |
| 2011/0261743 A1 | 10/2011 | Futaki et al. | |
| 2012/0002589 A1 | 1/2012 | Saifullah et al. | |

FOREIGN PATENT DOCUMENTS

| | | |
|---|---|---|
| CN | 1731887 | 2/2006 |
| CN | 1835627 | 9/2006 |
| EP | 0 889 664 | 1/1999 |
| EP | 1 148 753 | 10/2001 |
| EP | 1 304 898 | 4/2003 |
| EP | 1315356 A2 | 5/2003 |
| EP | 1337124 A2 | 8/2003 |
| EP | 1 372 310 A1 | 12/2003 |
| EP | 1511245 A2 | 3/2005 |
| EP | 1 720 322 A1 | 11/2006 |
| EP | 1932380 | 6/2008 |
| EP | 2087653 | 8/2009 |
| JP | 2003-087180 | 3/2003 |
| JP | 2003-196775 | 7/2003 |
| JP | 2003-235064 A | 8/2003 |
| JP | 2004-134904 A | 4/2004 |
| JP | 2005-039726 | 2/2005 |
| JP | 2005-057787 | 3/2005 |
| JP | 2006-528456 | 12/2006 |
| JP | 2007-165635 | 6/2007 |
| JP | 2008-535370 | 8/2008 |
| JP | 2008-539678 | 11/2008 |
| JP | 6-6294 A | 1/2009 |
| JP | 2009-540721 A | 11/2009 |
| JP | 2009-542100 A | 11/2009 |
| KR | 10-2001-0015234 | 3/2001 |
| KR | 10-2003-0026924 A | 4/2003 |
| RU | 2249917 | 4/2005 |
| WO | WO 00/74416 | 12/2000 |
| WO | WO 02/39622 | 5/2002 |
| WO | WO 2005/048613 A1 | 5/2005 |
| WO | WO 2006/000876 | 1/2006 |
| WO | WO 2006/011763 | 2/2006 |
| WO | WO 2006/018670 | 2/2006 |
| WO | WO 2006/049441 | 5/2006 |
| WO | WO 2006/075820 A1 | 7/2006 |
| WO | WO 2006/104344 | 10/2006 |
| WO | WO 2006/116620 | 11/2006 |
| WO | WO 2007/025138 | 3/2007 |
| WO | WO 2007-078929 A2 | 7/2007 |
| WO | WO 2007/133034 | 11/2007 |
| WO | WO2008/054103 A1 | 5/2008 |
| WO | WO 2008/096984 A1 | 8/2008 |
| WO | WO 2008/111684 | 9/2008 |
| WO | WO 2009/084998 A1 | 7/2009 |

OTHER PUBLICATIONS

Catt, Ritt: Enhancement to Buffer Status Reporting, R2-071345, 3GPP TSG-RAN WG2, 57bis, St. Julian's, Malta, Mar. 26-30, 2007, XP50134291.

LG Electronics, "PDCP Retransmissions" R2-073041, XP050135778, 3GPP TSG-RAN WG2 #59. Aug. 19-24, 2007, Athens, Greece.

LG Electronics, "PDCP Structure and Traffic Path" R2-073259, XP050135985, 3GPP TSG-RAN WG2 #59. Aug. 20-24, 2007, Athens, Greece.

LG Electronics, "Contents of PDCP Status Report" R2-07xxxx, XP002580785, 3GPP TSG-RAN WG2 #59. Oct. 8-12, 2007, Shanghai, China.

Bosch: "header compression signalling" 3GPP Draft; Header Compression Signalling, $3^{rd}$ Generation Partnership Project (3GPP), Mobile Competence Centre; vol. RAN WG2, No. Sophia Antipolis, France; Nov. 29, 1999, XP050114120.

"$3^{rd}$ Generation Partnership Project; Technical Specification Group radio Access Network; Packet Data Convergence Protocol (PDCP) specification (Release 7)" 3GPP Standard; 3GPP TS 25.323, $3^{rd}$ Generation Partnership Project (3GPP), Mobile Competence Centre; 650, Route Des Lucioles; F-06921 Sophia-Antipolis Cedex, France, No. V7.4.0, Mar. 1, 2007, pp. 1-44, XP050367856.

Asustek: "Granularity consideration for variable RLC PDU sizes" 3GPP Draft; R2-070336 Granularity Consideration for Variable RLC PDU Sizes, $3^{rd}$ Generation Partnership Project (3GPP), vol. RAN WG2, No. Sorrento, Italy; Jan. 12, 2007, XP050133423.

"$3^{rd}$ Generation Partnership Project; Technical Specification Group Radio Access Network; Medium Access Control (MAC) protocol specification (Release 7)"3GPP Standard; 3GPP TS 25.321, $3^{rd}$ Generation Partnership Project (3GPP), No. V7.4.0, Mar. 1, 2007, pp. 1-126, XP050367709.

Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637.

Nokia Corporation, Nokia Siemens Networks: "Mac Header Format" 3GPP TSG-RAN WG2 Meeting #59bis; R2-073891; Shanghai, China, Oct. 8-12, 2007, XP-002602993.

LG Electronics Inc: "Support or VoIP over MAC-hs/ehs"; 3GPP TSG-RAN WG2#57bis; R2-071542; St. Julian's, Malta; Mar. 26-30, 2007, XP-50134474A.

Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP-011184637.

Alcatel-Lucent: "DL Control Signaling and Multiplexing for VoIP" 3GPP TSG RAN WG1 Meeting #48bis; R1-071721; St. Julians, Malta Mar. 26-30, 2007, XP-002460800.

"$3^{rd}$ Generation Partnership Project; Technical Specification Group Radio Access Network; Evolved Universal terrestrial radio Access (E-UTRA) Medium Access Control (MAC) protocol specification (Release 8)", 3GPP Standard; 3GPP TS 36.321, Sophia-Antipolis, France, No. V8.1.0, Mar. 1, 2008, XP050377617.

LG Electronics: "3GPP Draft; UL Timing Control Related to Contention Resolution_R4", $3^{rd}$ Generation Partnership Project (3GPP), Shenzhen, China, Mar. 31-Apr. 4, 2008, R2-081607, XP50139334.

NTT DoCoMo, Inc.: "Views on DRX/DTX control in LTE", 3GPP TSG RAN WG2 #56, Nov. 6-10, 2006, Riga, Latvia, R2-063397.

Nokia: "Active mode DRX details", 3GPP TSG RAN WGx Meeting #55, Oct. 9-13, 2006, Seoul, Korea, R2-062753.

Email Rapporteur (Nokia): "DRX in E-UTRAN", 3GPP TSG-RAN WG2 Meeting #57, Feb. 12-16, 2007, St. Louis, Missouri, R2-070463.

Ericsson: "MAC header for Improved L2 support for high data rates", 3GPP TSG-RAN WG2 #57, St. Louis, Missouri, Feb. 12-16, 2007, R2-0708010, XP-50133836.

Ericsson: "Initial Random Access Procedure for E-UTRAN", 3GPP TSG-RAN WG2 #55, Seoul, Korea, Oct. 9-13, 2006, R2-062853.

Siemens: "Initial Access Procedure", 3GPP TSG WG2 LTE AdHoc Meeting, Cannes, France, Jun. 27-30, 2006, R2-061931.

Samsung: "LTE Random Access Procedure", 3GPP TSG RAN #54, Tallinn, Estonia, Aug. 28-Sep. 2, 2006, R2-062258.

IPWireless: "Contention Resolution in Non-Synchronous RACH Access", RAN #54, Tallin, Estonia, Aug. 28-Sep. 1, 2006, R2-062269.

RAN2#54, Tallinn, Estonia, Aug. 28-Sep. 1, 2006, Agenda Item: 11.3.4, Source: IPWireless, Title: Contention Resolution in Non-synchronous RACH Access, Document for: Discussion, R2-062269.

3GPP TSG-RAN WG2 #57, St. Louis, USA, Feb. 15-19, 2007, Agenda Item: 11.4, Source: LG Electronics, Title: Discussion on Message 4 in Random Access, Document for: Discussion and Decision, R2-070519.

3GPP TSG-RAN WG2 #57bis, St. Julian's, Malta, Mar. 26-30, 2007, Agenda Item: 5.4, Source: LG Eelctronics, Title: Discussion on Message 4 in Random Access, Document for: Discussion and Decision, R2-071456.

3GPP TSG-RAN WG2 #58, Kobe, Japan, May 7-11, 2007, Agenda Item: 4.6, Source: LG Electronics, Title: Discussion on Message 4 in Random Access, Document for: Discussion and Decision, R2-071923.

NTT DoCoMo, Inc: "E-mail discussion on U-plane ciphering location for LTE", 3GPP TSG RAN WG2 #57bis, St. Julian's, Malta, Mar. 26-30, 2007, R2-071293.

LG Electronics: "U-plane ciphering at MAC / Physical Layer", 3GPP TSG RAN WG2 #57bis, St. Julian's, Malta, Mar. 26-30, 2007, R2-071550.

NEC, Fast setup for PS services (Cell PCH & URA PCH), 3GPP TSG-RAN2 Meeting #54, Tallinn, Estonia, Aug. 28-Sep. 1, 2006, R2-062328.

LG Electronics, "Multi-level DRX Operation in Cell_PCH", 3GPP TSG-RAN #58, Kobe, Japan, May 7-11, 2007, R2-071930.

Catt, "Non-synchronized access and C-RNTI allocation", 3GPP TSG-RAN, WG2 #55, Seoul, Korea, Oct. 9-13, 2006, R2-062933.

Nokia, "Discontinuous reception in Cell_FACH", 3GPP TSG-RAN, WG2 #58, St. Julian's, Malta, Mar. 26-30, 2007, R2-071403.

LG Electronics, "DRX Scheme", 3GPP TSG-RAN, WG2 #56bis, Jan. 15-19, 2007, Sorrento, Italy, R2-070265.

"LTE Handover procedures, text proposal", 3GPP DRAFT; R2-061338 TP for TR 25813 on LTE Handover-FD, $3^{RD}$ Generation Partnership Project (3GPP), Mobile Competence Centre; 650, Route Des Lucioles; F-06921 Sophia-Antipolis Cedex; France, vol. RAN WG2, No. Shanghai, China; May 4, 2006, XP050131278, [retrieved on May 4, 2006] *p. 1, lines 7-10, paragraph 2*; *p. 1, lines 15-16, paragraph 2*; *p. 1, lines 27-30, paragraph 2*; *p. 3, lines 6-9*.

Samsung: "UL Timing Sync Procedure", Internet Citation, Mar. 27, 2006, XP002434793, Retrieved From the Internet: URL:http://www.3gpp.org/ftp/tsg_ran/wg2_rl2/tsgr2_52/documents/ [Retreived on May 23, 2007] *p. 1, paragraph 1*; *p. 3, paragraph 2.3*; *p. 4, lines 5-6, paragraph 3*.

R2-063034, "Open Issues in Random Access Procedure", Qualcomm Europe, Oct. 9-13, 2006 (Entirety).

3GPP TSG-RAN3 Meeting #53, R2-061338, Shanghai, China, May 8-12, 2006, Samsung; "LTE Handover Procedures, Text Proposal", pp. 1-16.

Ericsson: "Initial, Random Access and Identity Handling", 3GPP Draft; R2-060592, $3^{rd}$ Generation Partnership Project (3GPP), Mobile Competence Centre; 650, Route Des Lucioles; F-06921 Sophia Antipolis Cedex; France, vol. RAN WG2, No. Denver, USA; Feb. 9, 2006, XP050130549, [retrieved on Feb. 9, 2006].

3GPP TSG-RAN WG2 #57 bis, R2-071386, "Contention Resolution in aRACH", Samsung, Malta, Mar. 26-30, 2007.

3GPP TSG-RAN WG2 #57, R2-070910, "Contention Resolution and Initial Random Access", St. Louis, USA, Feb. 15-19, 2007.

3GPP TSG-RAN WG2 #56 bis, R2-070301, "Initial Access Procedure and C-RNTI Allocation," Sorrento, Italy, Jan. 15-19, 2007.

RAN2 #54, R2-062269, "Contention Resolution in Non-synchronous RACH Access", Tallinn, Estonia, Aug. 28-Sep. 1, 2006.

3GPP TSG RAN WG2 #Ad Hoc on Lte, R2-061986, "Initial Access Procedure", Cannes, France, Jun. 27-30, 2006.

* cited by examiner

METHOD OF RESTRICTING SCHEDULING REQUEST FOR EFFECTIVE DATA TRANSMISSION

This application is a national phase application based on International Application No. PCT/KR2008/005550, filed on Sep. 19, 2008, which claims priority to U.S. Provisional Application No. 60/974,072, filed on Sep. 20, 2007, all of which are incorporated by reference for all purposes as if fully set forth herein.

TECHNICAL FIELD

The present invention relates to a radio (wireless) communication system providing a radio communication service and a terminal, and more particularly, to a method for restricting a use of particular control channel between the terminal (User Equipment; UE) and a network (or a base station (eNB)) in an Evolved Universal Mobile Telecommunications System (E-UMTS) or a Long Term Evolution (LTE) system, thereby minimizing data transmission delay.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

As for downlink physical channels for transmitting information transferred via the channels used in downlink transmission over a radio interface between the network and the terminal, there is a Physical Broadcast Channel (PBCH) for transmitting BCH information, a Physical Multicast Channel (PMCH) for transmitting MCH information, a Physical Downlink Shared Channel (PDSCH) for transmitting PCH and a downlink SCH information, and a Physical Downlink Control Channel (PDCCH) (also, referred to as 'DL L1/L2 control channel') for transmitting control information provided by the first and second layers such as a DL/UL Scheduling Grant, and the like. As for uplink physical channels for transmitting information transferred via the channels used in uplink transmission over a radio interface between the network and the terminal, there is a Physical Uplink Shared Channel (PUSCH) for transmitting uplink SCH information, a Physical Random Access Channel (PRACH) for transmitting RACH information, and a Physical Uplink Control Channel (PUCCH) for transmitting control information provided by the first and second layers, such as a HARQ ACK or NACK, a Scheduling Request (SR), a Channel Quality Indicator (CQI) report, and the like.

Description of a procedure for an uplink time synchronization alignment in a related art LTE system will be given. In the related art LTE system, the time synchronization of uplink must be aligned in order to minimize interferences between terminals. Therefore, to align the uplink time Sync, a base station (or network) calculates a time Sync alignment value based on certain control signals transmitted from a terminal, transmits the calculated time Sync alignment value to the terminal, and then the terminal applies such time Sync alignment value for uplink time alignment. More specifically, the base station calculates a time Sync alignment value of a terminal using a random access preamble or Sounding Reference Symbols (SRS) transmitted from the terminal. After the calculation, the base station transmits the calculated time Sync alignment value whenever it is necessary. After the time Sync alignment value is received by the terminal, the terminal then applies the time Sync alignment value, and starts or restarts a timer for the time Sync. It is assumed that the uplink synchronization is considered to be maintained until the expiration of the started or restarted timer, and the terminal can not transmit any other data or control signal to the uplink except a transmission of random access preamble after the timer is expired. Generally, the terminal has to request a radio resource to the base station when the radio resource is necessary for the uplink transmission. Here, if the terminal has a PUCCH (Physical Uplink Control Channel) assigned from the base station for a transmission of Scheduling Request (SR), the terminal can request the radio resource through the PUCCH. After such request from the terminal, the base station can allocate adequate radio resource to the terminal, and the terminal can transmit an uplink data using the allocated radio resource.

However, this is some case that a transmission of uplink data using the allocated radio resource is failed due to the expiration of the timer. For example, it is assumed that total time for the terminal to transmit the Scheduling Request (SR) to the base station through the PUCCH, to receive the allocated radio resource, and to transmit the uplink data using the allocated radio resource is 20 ms. Also, it is assumed that a remaining time from the transmission of the SR to the expiration of timer is 15 ms. In this case, if the terminal can not obtain a new time Sync alignment value for the next 15 ms from the base station, as described above, the terminal can not transmit any other data or control signal to the uplink except the random access preamble because the uplink synchronization is still considered to be maintained. Namely, as depicted in FIG. 4, the terminal transmits the Scheduling Request (SR) for a radio resource allocation to a base station at a time that the timer is still in operation. However, such SR transmission would be wasted at the time that the uplink data needs to be transmitted, as the uplink data can not be transmitted due to the expiration of the timer. Instead, the terminal has to perform a random access procedure for time synchronization. Such time waste or time delay due to the expiration of the timer would cause a great drawback in the related art.

DISCLOSURE OF INVENTION

Technical Solution

Therefore, an object of the present invention is to provide a method for restricting a use of particular control channel, and more particularly, for restricting a Physical Uplink Control Channel (PUCCH), which used for requesting a Scheduling Request (SR), based on instructed conditions by a terminal (e.g., UE) or a base station (e.g., eNB).

To achieve this and other advantages and in accordance with the purpose of the present invention, as embodied and broadly described herein, there is provided a method of communicating data in wireless communication system, the method comprising: receiving configuration information of a physical channel used for a transmission of a request message; receiving information related to prohibited condition for the transmission of request message; determining whether or not the request message is capable to transmit according to the received information; and performing a next operation according to the determining step.

To achieve this and other advantages and in accordance with the purpose of the present invention, as embodied and broadly described herein, there is also provided a method of communicating data in wireless communication system, the method comprising: transmitting configuration information of a physical channel used for a transmission of a request message by a terminal; transmitting information related to a prohibited condition indicating whether or not the request message is capable to transmit by the terminal; and receiving the request message on the physical channel based on the configuration information if the prohibited condition is not met or receiving a random access preamble if the prohibited condition is met.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 1:
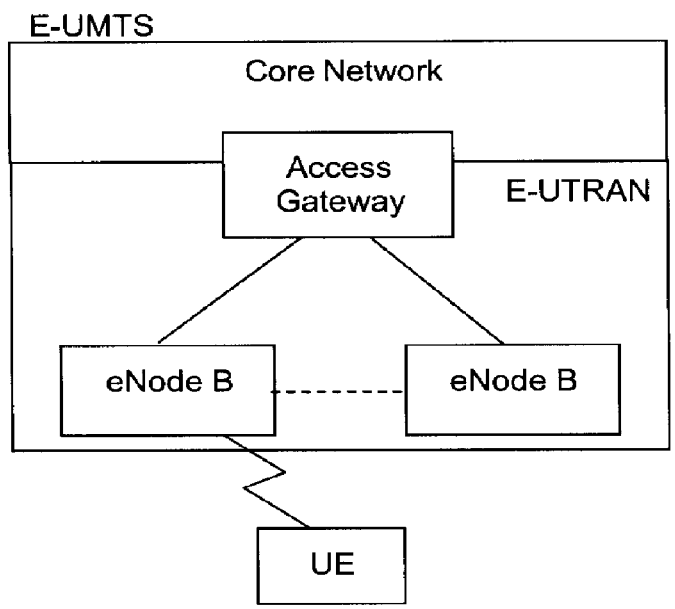
FIG. 1 shows an exemplary network structure of an Evolved Universal Mobile Telecommunications System (E-UMTS) as a mobile communication system to which a related art and the present invention are applied.
Figure 2:
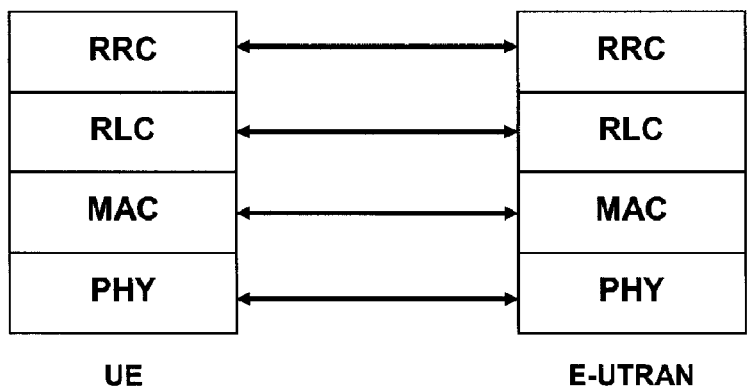
FIG. 2 shows an exemplary view of related art control plane architecture of a radio interface protocol between a terminal and an E-UTRAN.
Figure 3:
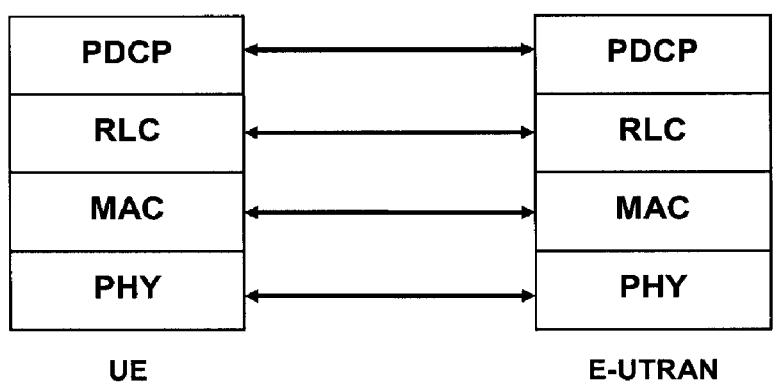
FIG. 3 shows an exemplary view of related art user plane architecture of a radio interface protocol between a terminal and an E-UTRAN.
Figure 4:
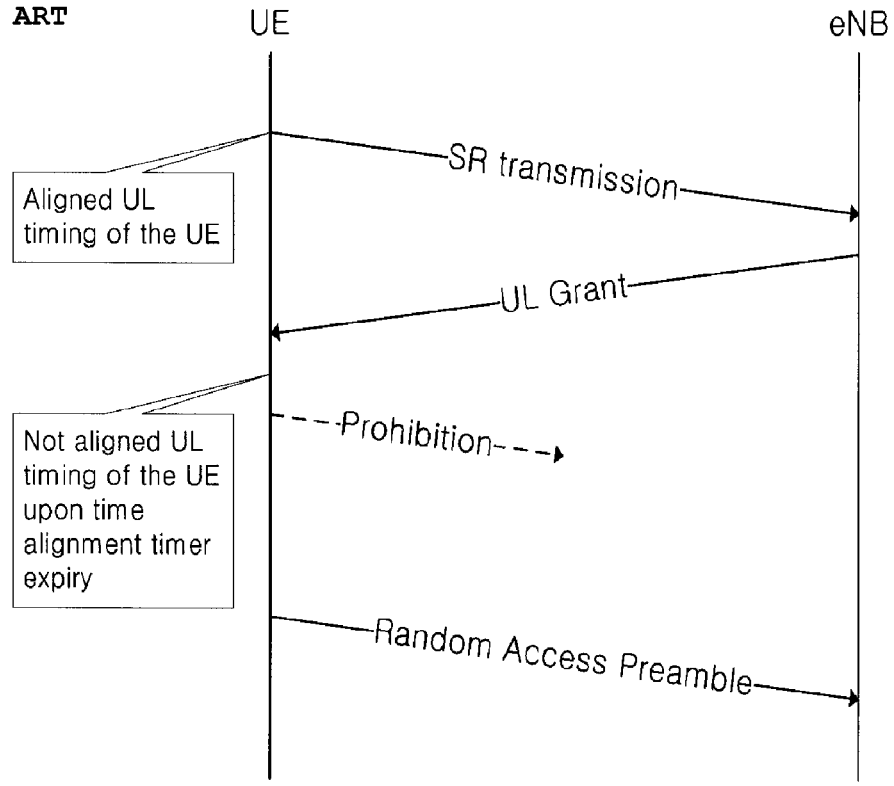
FIG. 4 shows an exemplary view of data transmission failure using allocated radio resource due to timer expiration
Figure 5:
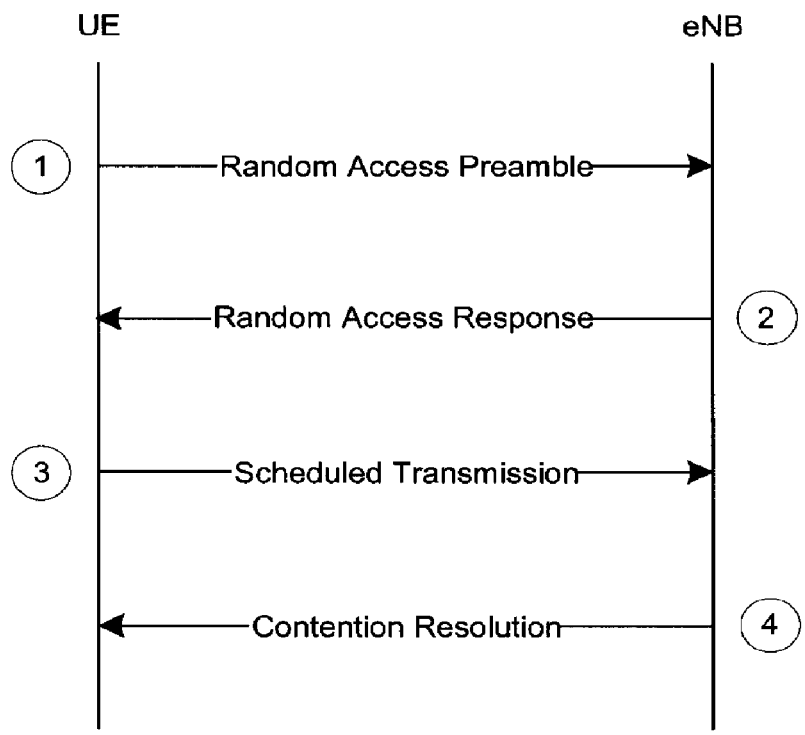
FIG. 5 shows an exemplary view of a contention based random access procedure.

Based on the above description, FIG. 5 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 6:
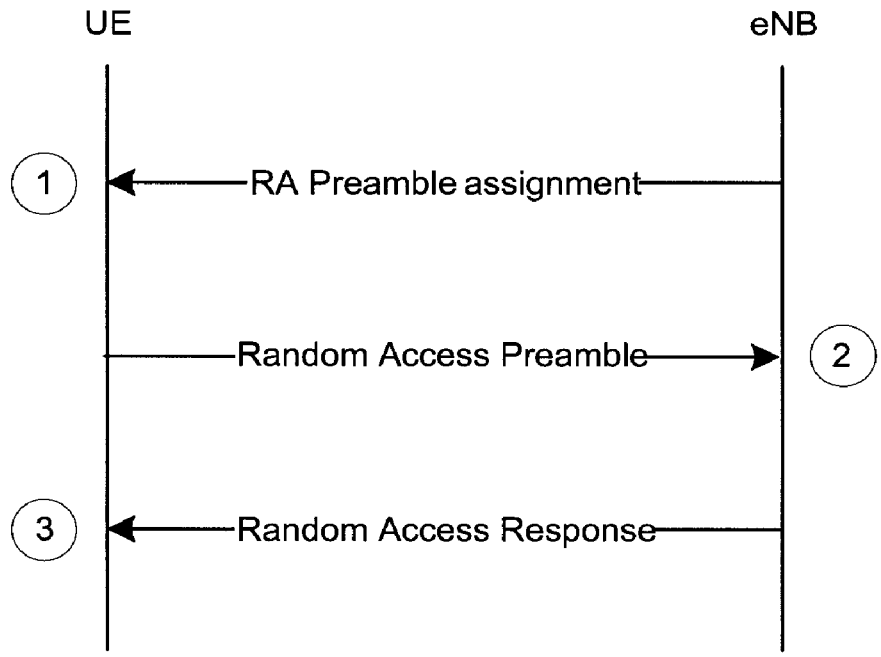
FIG. 6 shows an exemplary view of a non-contention based random access procedure.

FIG. 6 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

Figure 7:
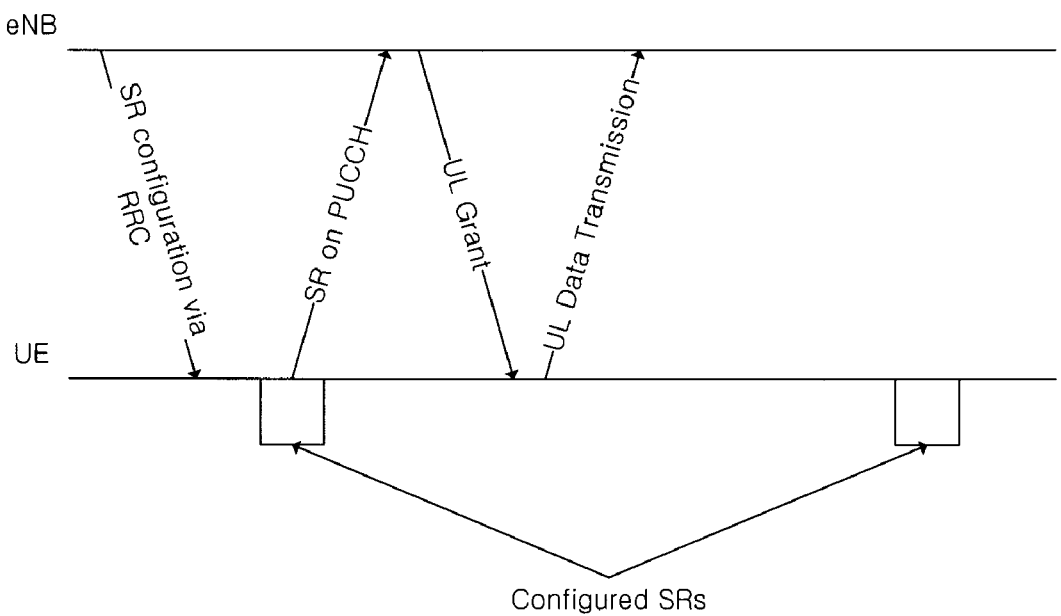
FIG. 7 shows an exemplary view of a procedure for requesting a radio resource using Scheduling Request (SR) on Physical Uplink Control Channel (PUCCH) according to the present invention.

FIG. 7 shows an exemplary view of a procedure for requesting a radio resource using a Scheduling Request (SR) on a Physical Uplink Control Channel (PUCCH) according to the present invention.

The Physical Uplink Control Channel (PUCCH) is used for a transmission of the Scheduling Request (SR) such that a terminal may request an uplink radio resource(s) to a base station. Here, the base station may pre-allocate PUCCH radio resource to a particular terminal. For example, the base station may set frequency/time information of the PUCCH radio resource through a RRC (Radio Resource Control) signal. The terminal having the PUCCH radio resource, may request the uplink radio resource to the base station by transmitting the Scheduling Request using the pre-allocated PUCCH radio resource. After receiving the Scheduling Request, the base station may adequately allocate radio resource to the terminal.

According to the present invention, a terminal (UE) having a PUCCH (referred as D-SR below) radio resource allocation for a Scheduling Request, may be restricted to transmit the D-SR based on a condition indicated by a base station (eNB) even if the D-SR transmission is required in a particular situation. Further, in the present invention proposes the terminal to immediately perform random access procedure without any time delay when the D-SR transmission is restricted as described above. Namely, in above situation, the present invention proposes to transmit a random access preamble to the base station instead of transmitting the Scheduling Request. Preferably, the transmission of D-SR is required when a buffer status report (BSR) is triggered and there is no uplink radio resource.

According to the present invention, the following conditions or methods may be provided to restrict the transmission of D-SR. First, a particular time value may be used for a condition to restrict the transmission of D-SR. For example, the base station may set the particular time as 10 ms and may indicate it to the terminal. Then, the terminal may not perform the transmission of D-SR if a time Sync time in the terminal is expected to expire within 10 ms. Second, a particular timer (or timer value) may be used. For example, the base station may set to start or restart the particular timer that restricts the transmission of D-SR in a certain condition. Accordingly, the terminal may start or restart the particular timer based on the certain condition, thereby allow restricting the transmission of D-SR when it is necessary. Third, the terminal or base station may calculate a total number of the D-SR transmission, and then may restrict to transmit the D-SR when the total number of the D-SR transmission is equal to an allowed maximum number set by the terminal or base station. Here, the particular time value, the particular timer, or the allowed maximum number for the D-SR transmission, may be indicated to the terminal through a RRC (Radio Resource Control) signal. Also, the RRC signal may include system information and/or a handover command.

Figure 8:
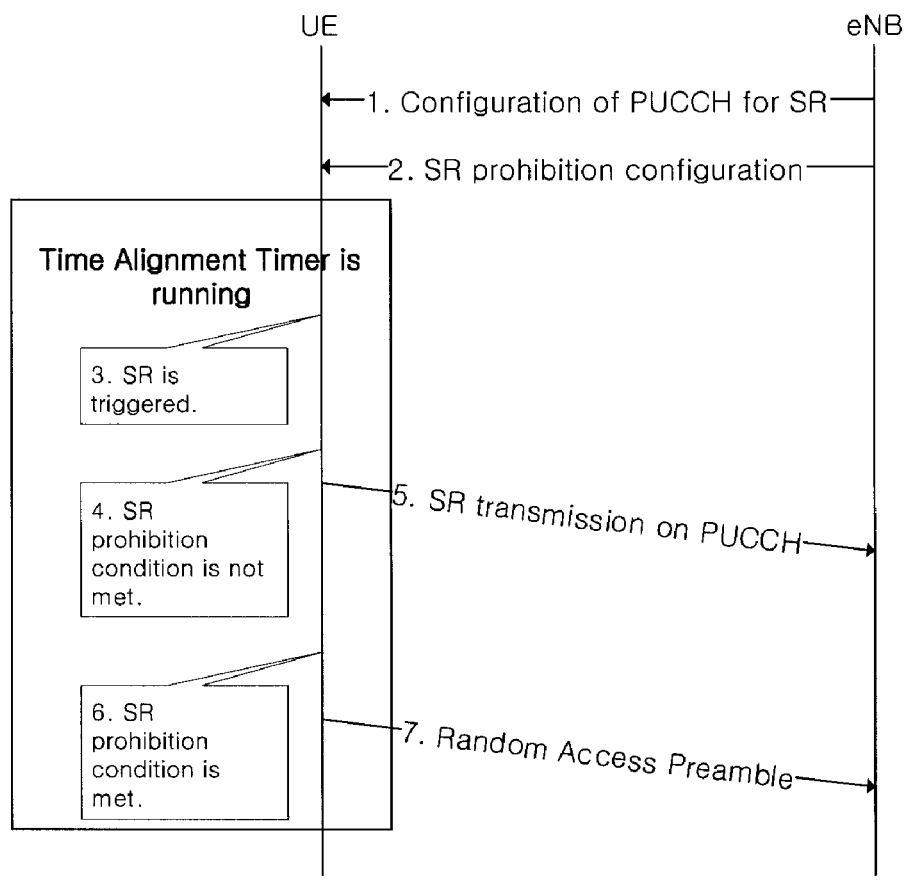
FIG. 8 shows an exemplary view of a procedure for transmitting random access preamble instead of Scheduling Request (SR) based on Scheduling Request restrict condition setting according to the present invention.

FIG. 8 shows an exemplary view of a procedure for transmitting random access preamble instead of Scheduling Request (SR) based on Scheduling Request restrict condition setting according to the present invention.

First, the terminal may receive a configuration of the physical uplink control channel (PUCCH) for the scheduling request (SR). (Step 1) Also, the terminal may receive information related to a SR prohibition configuration through a RRC message. (Step 2) Here, the information related to the SR prohibition configuration may be received together with the configuration of the PUCCH of the step 1. Thereafter, the terminal may trigger scheduling request (SR) if there is some uplink data needs to be transmitted but a radio resource for transmitting the uplink data is not available. When the SR is triggered, the terminal may trigger the transmission of PUCCH since the terminal is set with the PUCCH for the SR. (Step 3) When the transmission of PUCCH is triggered, the terminal may determine whether or not the SR prohibit condition is met. (Step 4, 6) For example, the terminal may transmit the PUCCH if the time Sync timer is expected to be expired after the time value (Tms) set by the base station or terminal, and the terminal may not transmit the PUCCH if the time Sync timer is expected to be expired before the time value (Tms). Namely, the terminal may transmit the PUCCH if the SR prohibit condition is not met. (Step 5) If the SR prohibit condition is met, the terminal may not transmit the PUCCH, and initiate a random access procedure by transmitting a random access preamble. (Step 7)

It can be said that the present disclosure may provide a method of communicating data in wireless communication system, the method comprising: receiving configuration information of a physical channel used for a transmission of a request message; receiving information related to prohibited condition for the transmission of request message; determining whether or not the request message is capable to transmit according to the received information; and performing a next operation according to the determining step, wherein the next operation is to transmit the request message on the physical channel based on the received configuration information if the request message is capable to transmit, the next operation is to transmit a random access preamble if the request message is not capable to transmit, triggering the request message before the determining step, the request message is triggered when there is no uplink radio resource for a data transmission, the physical channel is a Physical Uplink Control Channel (PUCCH), the request message is transmitted to request an uplink radio resource, the request message is a Scheduling Request (SR), the configuration information of the physical channel and the information related to the prohibited condition are received simultaneously, and the prohibited condition is associated with at least one of time alignment timer, a particular timer that restricting a transmission of the request message, and a maximum number of request message transmission.

The present disclosure may also provide a method of communicating data in wireless communication system, the method comprising: transmitting configuration information of a physical channel used for a transmission of a request message by a terminal; transmitting information related to a prohibited condition indicating whether or not the request message is capable to transmit by the terminal; and receiving the request message on the physical channel based on the configuration information if the prohibited condition is not met or receiving a random access preamble if the prohibited condition is met, wherein the physical channel is a Physical Uplink Control Channel (PUCCH), the request message is a Scheduling Request (SR), and the configuration information of the physical channel and the information related to the prohibited condition are transmitted simultaneously.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of communicating data in wireless communication system, the method comprising:

receiving, by a terminal, configuration information of a physical channel used for a transmission of a request message;

receiving, by the terminal, information related to a prohibited condition for the transmission of request message, wherein the prohibited condition is associated with at least one of a time alignment timer, a particular timer that restricts a transmission of the request message, and a maximum number of request message transmissions, and wherein the at least one of time alignment timer is used for controlling an uplink time alignment;

determining whether or not the request message is capable to transmit according to the received information; and performing, by the terminal, a next operation according to the determining step, wherein the next operation is to transmit the request message on the physical channel based on the received configuration information if the request message is capable to transmit, wherein the next operation is to transmit a random access preamble if the request message is not capable to transmit, and wherein the request message is a Scheduling Request (SR) message that is used to request an uplink radio resource.

2. The method of claim 1, further comprising:

triggering the request message before the determining step.

3. The method of claim 2, wherein the request message is triggered when there is no uplink radio resource for a data transmission.

4. The method of claim 1, wherein the physical channel is a Physical Uplink Control Channel (PUCCH).

5. The method of claim 1, wherein the configuration information of the physical channel and the information related to the prohibited condition are received simultaneously.

6. A method of communicating data in wireless communication system, the method comprising:

transmitting configuration information of a physical channel used for a transmission of a request message by a terminal;

transmitting information related to a prohibited condition indicating whether or not the request message is capable to transmit by the terminal, wherein the prohibited condition is associated with at least one of a time alignment timer, a particular timer that restricting a transmission of the request message, and a maximum number of request message transmissions, and wherein the at least one of time alignment timer is used for controlling an uplink time alignment; and receiving the request message on the physical channel based on the configuration information if the prohibited condition is not met or receiving a random access preamble if the prohibited condition is met, wherein the request message is a Scheduling Request (SR) message that is used to request an uplink radio resource by the terminal.

7. The method of claim 6, wherein the physical channel is a Physical Uplink Control Channel (PUCCH).

8. The method of claim 6, wherein the configuration information of the physical channel and the information related to the prohibited condition are transmitted simultaneously.

* * * * *